Oct. 13, 1942.   J. H. HAYES   2,298,481
FISHING REEL
Filed June 30, 1939   4 Sheets-Sheet 2
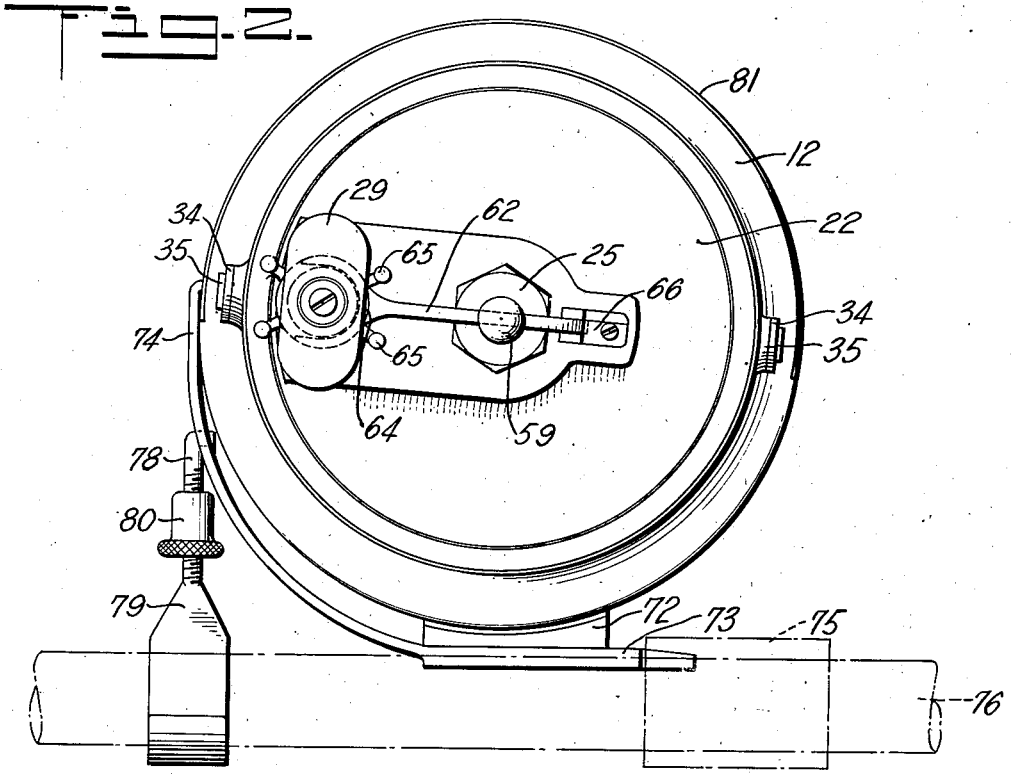
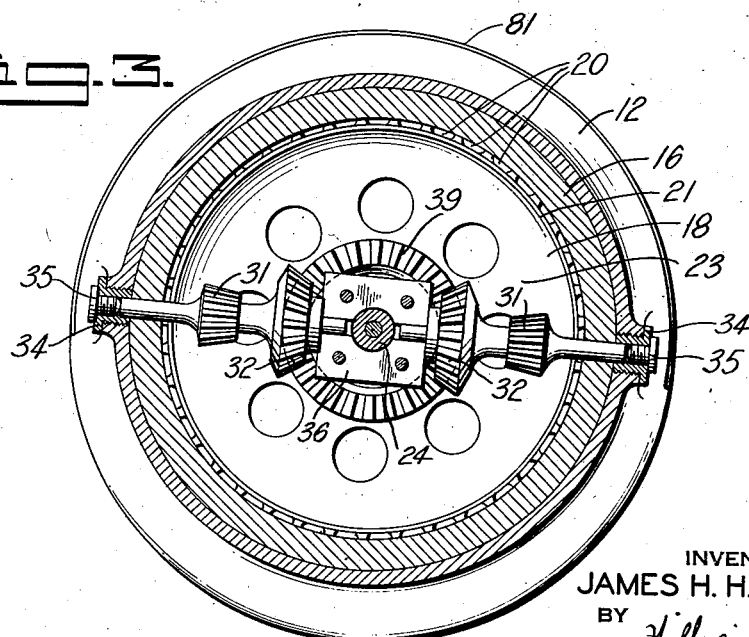
INVENTOR
JAMES H. HAYES
BY *William Lang*
ATTORNEY Oct. 13, 1942.                J. H. HAYES                2,298,481
                              FISHING REEL
                         Filed June 30, 1939          4 Sheets-Sheet 3

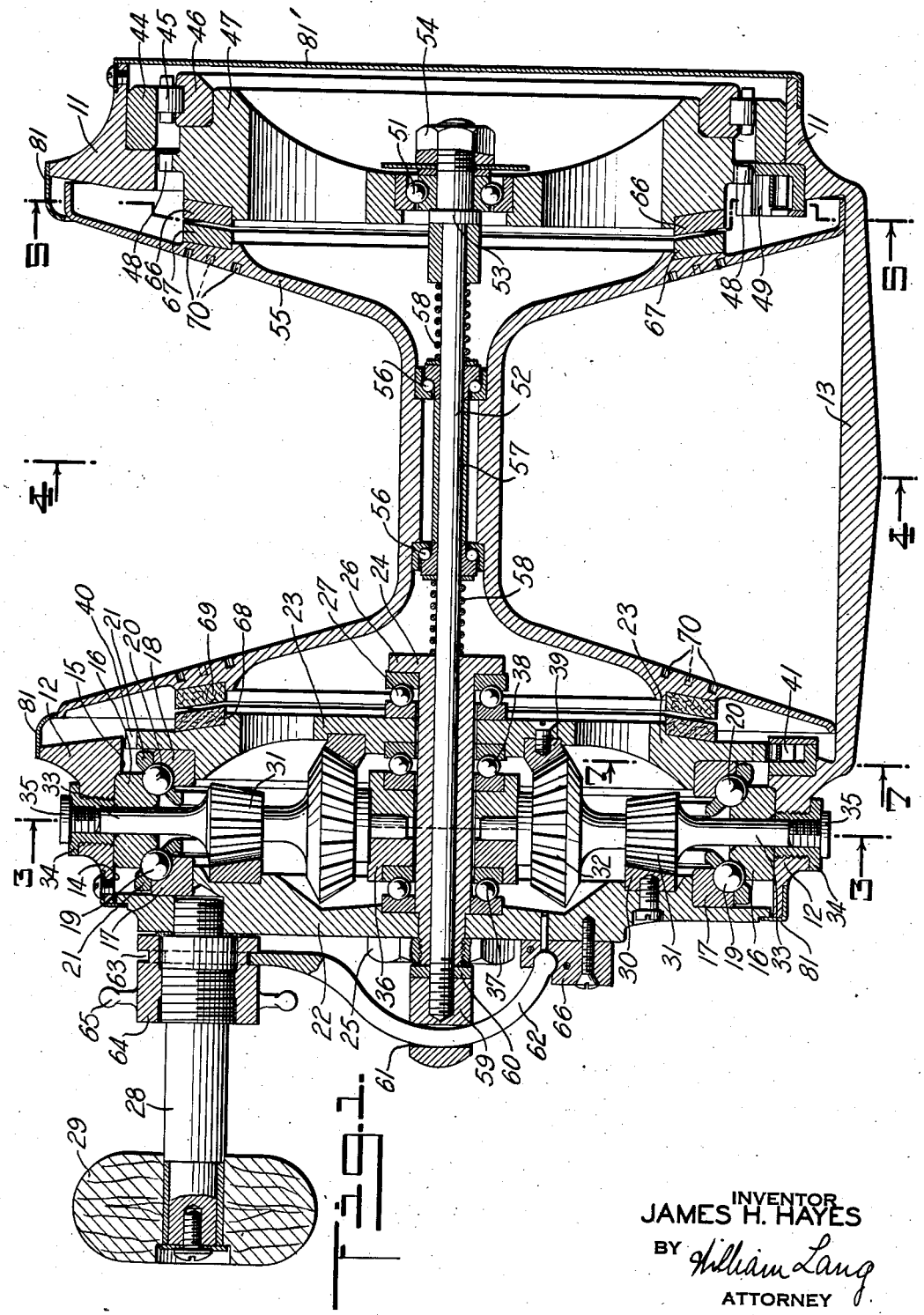

INVENTOR
JAMES H. HAYES
BY William Lang
ATTORNEY

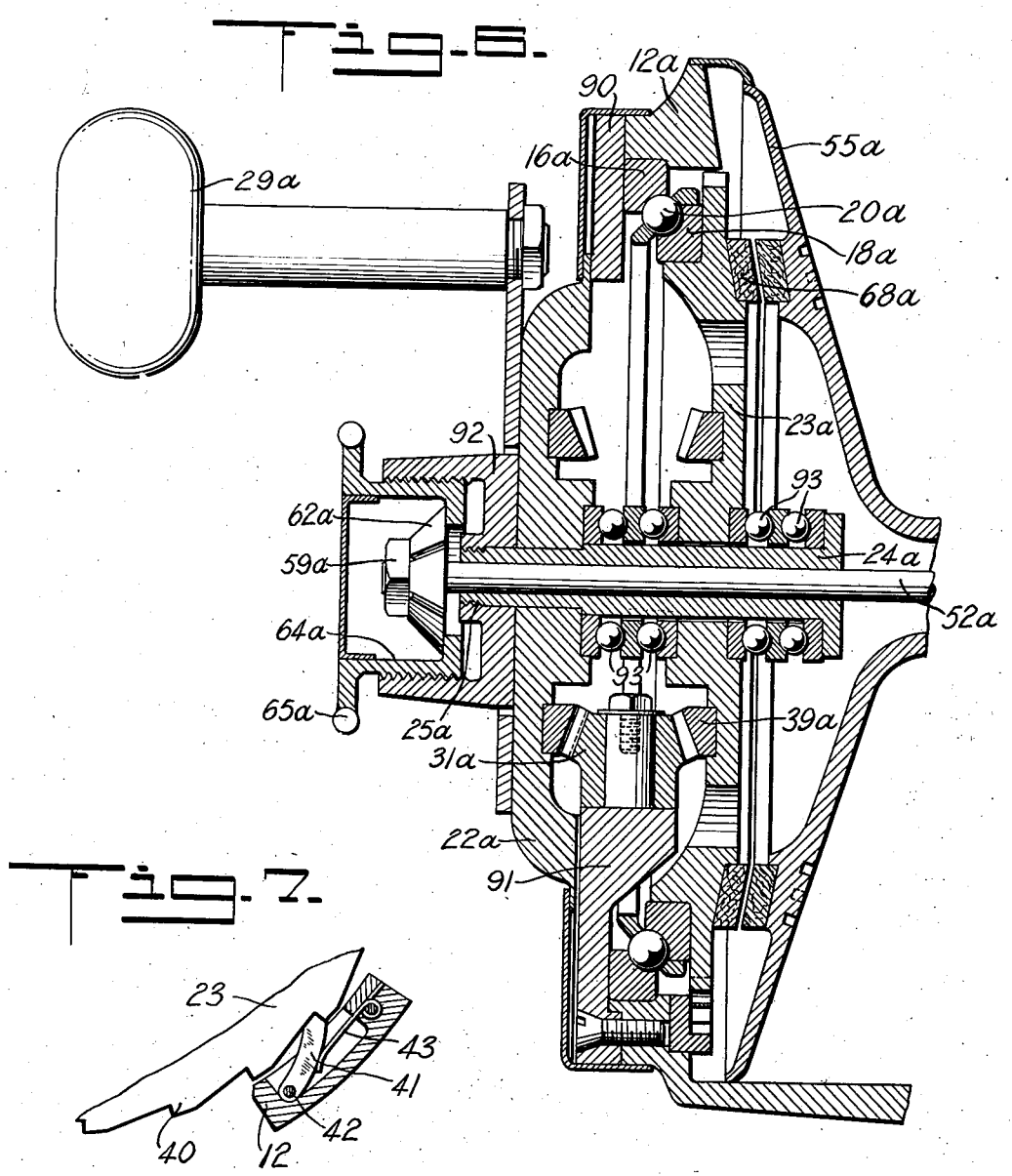

Patented Oct. 13, 1942

2,298,481

UNITED STATES PATENT OFFICE 2,298,481

FISHING REEL

James H. Hayes, New York, N. Y.

Application June 30, 1939, Serial No. 282,039

21 Claims. (Cl. 242—84.5)

This invention relates to fishing reels and particularly to that type of reel which is adapted for salt water fishing, having the several features which adapt the reel for this type of fishing together with additional features and combinations as will be set out more fully hereinafter.

One of the objects of the invention is to provide a sturdier and more efficient reel than has heretofore been available, especially for withstanding the very heavy strains imposed upon a reel in deep sea fishing.

Another object of the invention is to provide an improved gear drive for a reel in which the gears are constantly in mesh and are only rotated when drawing in the line.

A further object resides in the provision of a freely mounted reel arranged for self-centering upon ball bearings and to each end of which a brake is applied whereby braking is effected evenly to both ends of the reel.

A still further object resides in the provision of an improved brake-applying mechanism for a reel which serves to couple the reel to the driving gears for advance of the reel.

A further object resides in the improved arrangement of a spool holding mechanism which consists of a double pawl and ratchet located one at each end of the spool against which the spool may be frictionally held and the pressure on the spool thus equalized. These pawls are located near the outer edge of the spool where the strain thereon is the least.

A still further object resides in the improved arrangement of braking mechanism for the spool wherein the spool itself carries braking elements and provision is made for effecting automatic cooling of the braking surfaces.

Another object resides in the provision of an improved drive gear construction utilizing compound bevel and ring gears to obtain a desired driving ratio between the reel and operating handle.

A still further object resides in a novel drive mechanism which consists of bevel and ring gearing supported in an external bearing which takes the load away from the central rod and also carries the load of the spool when the latter is coupled to the drive mechanism.

A further object resides in the provision of an improved drag mechanism for applying braking pressure to the spool or reel.

Further and other objects of the present invention will be hereinafter set forth in the accompanying specification and claims and shown in the drawings which by way of illustration show what is now considered to be preferred embodiments of the invention.

In the drawings:

Fig. 1 is a central section through the complete reel taken along the central axis thereof.

Fig. 2 is an end view of the reel looking toward the right in Fig. 1 showing the manner of securing the reel to the rod.

Fig. 3 is a sectional view taken along the lines 3—3 of Fig. 1.

Fig. 6 is a sectional view of one end of a modified arrangement.

Fig. 7 is a detail taken along lines 7—7 of Fig. 1.

Figure 4:
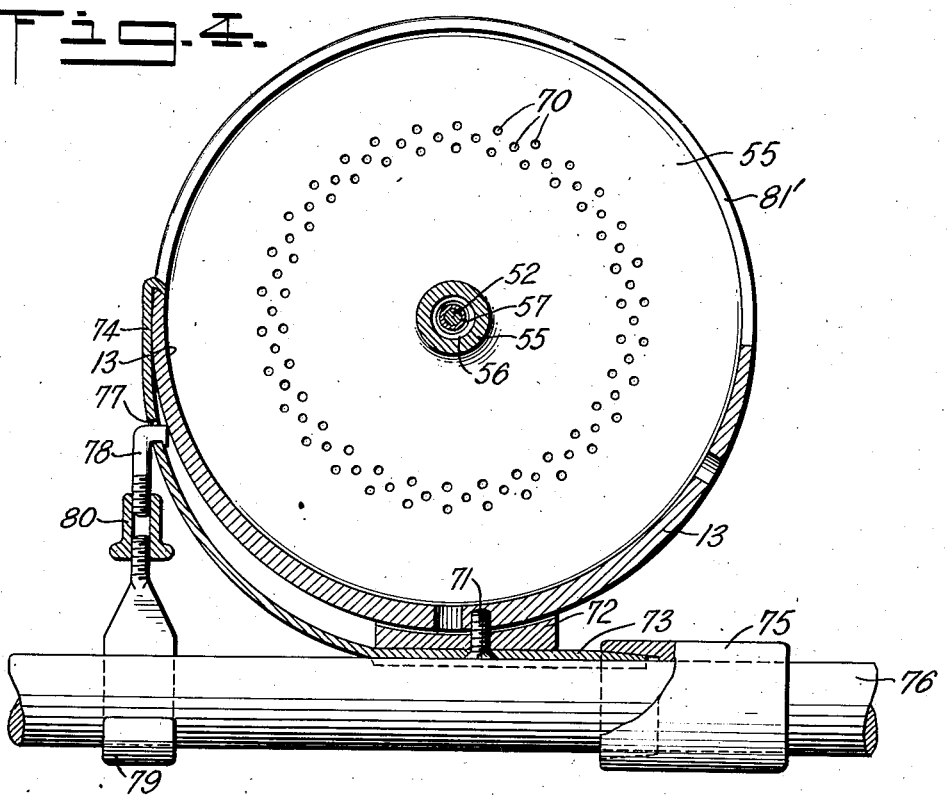
Fig. 4 is a sectional view taken along the lines 4—4 of Fig. 1.
Figure 5:
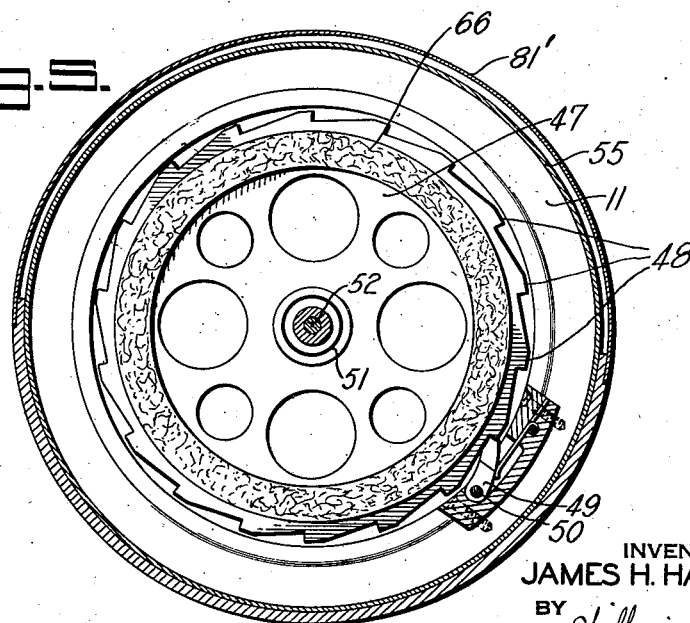
Fig. 5 is a sectional view taken along the lines 5—5 of Fig. 1.

Referring to Fig. 1, the reel mechanism is supported in a housing comprising end sections 11 and 12 integrally connected by cross member 13. Secured within a circular recess 14 of end section 12 and abutting a shoulder 15 is the race 16 of a double bearing from which is spaced the outer race 17 of the bearing and the inner race 18, sets of balls 19 and 20 maintaining the spacing of the outer and inner races respectively. Spacers 21 maintain balls 19 and 20 in position around the outer peripheries of their respective races.

The outer race 17 is secured to a disc 22 and the inner race 18 is secured to a disc 23, which discs are tied together in the following manner. A sleeve 24 has a section of reduced diameter extending through a central opening in disc 22 and secured to the disc by a lock nut 25. The opposite end of sleeve 24 has a flanged head 26 between which and disc 23 is a thrust bearing 27. By tightening nut 25, the parts are drawn together as shown in Fig. 1 permitting each disc 22 and 23 to rotate freely upon the fixed race 16.

Extending outwardly from disc 22 and securely threaded therein is a stud 28 whose outer end carries a handle 29 mounted so as to be freely rotatable on the stud. By means of the handle 29 disc 22 may be rotated in a clockwise direction, as viewed in Fig. 2. To the inner surface of disc 22 is secured a ring gear 30, which when the disc 22 is rotated by handle 29 will cause rotation of each of a pair of bevel pinions 31.

Each pinion 31 has integral therewith a bevel gear 32 of larger diameter, and a pivoted stem 33. The outer end of stem 33 is rotatable in a sleeve 34 threaded in a suitable opening in the end section 12 which constrains the stem against rotation about the center of the reel. Threaded into sleeve 34 is a screw 35 to maintain the stem in position by bearing against the outer extremity thereof.

The inner end of stem 33 is supported in a suitable opening in a split block 36, which block is freely mounted about sleeve 24 and supported by thrust bearings 37 and 38 located at either side of the block. By means of this construction, block 36 is in effect held integral with the race 16 and end section 12.

Both bevel gears 32 mesh with a ring gear 39, secured to the inner disc 23. With the reel housing held stationary, handle 29 when turned about the axis of the reel will rotate disc 22 whose ring gear 30 will cause rotation of pinions 31 with their stems 33. As a result, bevel gear 32 will rotate ring gear 39 and its disc 23 in the opposite direction to the rotation of disc 22 and at a greater speed depending on the ratio between pinion 31 and gear 32.

Disc 23 is provided with ratchet teeth 40 (Fig. 7) which are engageable by a ratchet pawl 41 pivoted to the end section 12 at 42 and urged into engagement with teeth 40 by a leaf spring 43. The disc 23 can therefore rotate in only one direction which is counterclockwise as viewed in Fig. 7.

At the other end of the reel, within end section 11 is secured a bearing race 44 which through roller bearings 45 spaced in a circle supports an inner race 46 secured to a member 47 which is mounted for movement of translation in the direction of the axis of the reel, the roller bearings 45 being arranged to permit such movement. Member 47 is also provided with ratchet teeth 48 with which a spring pressed pawl 49 pivoted at 50 to end section 11 cooperates to restrain the member against clockwise movement.

At its center, member 47 carries a ball bearing 51 which is locked to one end of a rod 52 by being clamped between a shoulder 53 of enlarged diameter of the rod and a nut 54, so that if the rod 52 is moved axially the member 47 will move likewise therewith. It will be noted that pawl 49 is of sufficient width to permit movement of member 47 to the left as viewed in Fig. 1, while maintaining teeth 48 in cooperation with the pawl.

Located centrally between disc 23 and member 47 is the spool 55 which is freely rotatable on a pair of ball bearings 56 spaced on rod 52 by a sleeve 57. A pair of balanced springs 58 at each side of the bearings 56 serve to normally hold the spool 55 in the central position shown in Fig. 1 wherein it is entirely free to rotate.

The left hand end of rod 52 has threaded thereon a block 59 and a lock nut 60. The block has an opening 61 therein, through which a scythe-shaped spring 62 passes. The upper end of spring 62 is bifurcated to straddle an annular groove 63 in a member 64, which member is internally threaded on stud 28 and is provided with knobs 65 which are grasped to rotate the member 64.

The lower end of spring 62 is rounded as shown and seated in a socket in block 66 fastened to disc 22. When member 64 is rotated on stud 28 in a direction to move the member toward knob 29, spring 62 will rock counterclockwise as viewed in Fig. 1 about its rounded end as a pivot and its curved surface will bear against the left side of the opening 61 in block 59 to urge the block and with it the rod 52 toward the left, with the result that member 47 is drawn therewith in the same direction.

The inner face of member 47 has secured thereto a braking ring 66 which is engageable with a companion braking ring 67 secured to spool 55. In like manner, the inner face of disc 23 has secured thereto a braking ring 68 engageable with a companion braking ring 69 secured to spool 55.

Whenever rod 52 is drawn to the left as viewed in Fig. 1, member 47 moves in the same direction to cause compression of springs 58 and ultimately produce simultaneous engagement of members 47 and 23 at opposite ends of spool 55. By turning the knobbed member 64 sufficiently, the disc 23, spool 55 and member 47 are locked together so that rotation of disc 22 through handle 29 will cause the spool 55 to turn at a greater rate in accordance with the ratio of the gearing 30, 31, 32 and 39.

When a "free spool" is desired, it is simply necessary to release knobbed member 64 whereupon the parts will take the relative positions shown in Fig. 1. In operation, the line is cast with the spool in "free spool" condition and then member 64 is adjusted to obtain the desired amount of "drag" on the spool. This is effected by bringing the braking rings into engagement with one another with less than locking contact and so that the spool can slip slightly while the ratchet pawls 40 and 49 lock the disc 23 and member 47 against rotation in the direction of pull of the line. To draw the line in, a slight additional adjustment of member 64 will lock the spool 55 to the positively driven disc 23.

The flanges of spool 55 are provided with a plurality of recesses 70 located in line with the braking rings 67 and 69 into which recesses water will flow as the line is drawn in, and will aid in cooling the braking rings.

Referring now to Fig. 4, the cross member 13 of the housing may have detachably secured thereto as by bolt 71 a block 72 to which is welded a foot plate 73 with a curved upwardly extending portion terminating in a hook 74 which fits over the edge of cross member 13. The foot plate 73 is configured to be received in the usual socket 75 of the rod 76. The curved part of plate 73 has a hole 77 into which a hook 78 fits. A companion hook 79 partially encircles the rod 76 and a turnbuckle 80 connects the two hooks together. By adjusting the turnbuckle 80 the pot plate 73 and through it the housing of the reel is securely held on the rod 76.

It may be observed that the pairs of braking rings 66, 67 and 68, 69 are oppositely inclined so that, when the spool 55 is in "locked" condition, the load is taken by the discs 23 and 47 and such load is not directly borne by the central rod 52. Further, the load is also taken by the pawls 40 and 49 at the circumference of discs 23 and 47, which pawls area at a greater distance from the center of rotation and beyond the braking surfaces thereby affording a more efficient stop, as well as equalizing the strain on the spool.

Suitably configured cover plates generally designated 81 for the left hand end and 81' for the right hand end, are provided to enclose the ends of the reel and cover the spool ends.

In Fig. 6 is shown a simplified arrangement of gearing and drag mechanism in which the disc 23a has secured thereto bearing race 18a whose other race 16a is recessed in end section 12a in the same manner as the corresponding parts in the embodiment of Fig. 1. Race 16a is held in position by a plate 90 attached to section 12a, which plate is provided with a boss 91 upon which is pivoted a bevel pinion 31a meshing with ring gear 39a of disc 23a. At the outer side of plate 90 is disc 22a through which extends a section of reduced diameter of sleeve 24a.

Secured to disc 22a is a hub 92 against which a collar 25a on sleeve 24a bears. Along sleeve 24a are bearings 93 which space discs 22a and 23a and the flanged head of the sleeve and maintain this spaced relationship. Disc 22a also has secured to its inner face a ring gear meshing with pinion 31a so that as disc 22a is rotated by means of handle 29a, disc 23a will be rotated at the same speed but in the opposite direction, the whole moving assemblage rotating on the balls 20a of the large bearing.

Hub 92 is threaded internally to receive a member 64a, having knobs 65a. The end of rod 58a has secured thereto a collar 59a between which and the inner face of member 64a is disposed a cupped spring 62a formed to provide a plurality of spring blades urging collar 59a away from the inner face of member 64a. By turning member 64a in one direction, rod 52a is urged to the left as viewed in Fig. 6, through the intermediary spring 62a to apply the desired degree of pressure on the spool 55a and by turning member 64a in the opposite direction the pressure or drag is released.

The arrangement shown in Fig. 6 obtains the same results as the main embodiment with fewer parts and provides a lighter weight reel for use where such is desirable.

While there has been shown and described and pointed out the fundamental novel features of the invention as applied to the preferred modification, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is:

1. In a fishing reel, a reel housing, a gear structure mounted in said housing for rotation on an axis transverse to the axis of the reel housing, a ring gear concentric with the reel axis and meshing with said gear structure, a second ring gear concentric with the reel axis and meshing with said gear structure, said ring gears being arranged on opposite sides of the gear structure, a spool coaxial with the reel housing and located adjacent to said second ring gear, means for causing frictional engagement between said spool and said second ring gear, and a handle for said first ring gear whereby the same may be rotated and through said gear structure cause rotation of the second ring gear and the connected spool in the opposite direction.

2. The invention set forth in claim 1 in which said first named ring gear is larger in diameter than the second ring gear and in which said gear structure comprises a pair of coaxial bevel gears of different diameter, with the smaller bevel gear meshing with the said first ring gear and the larger bevel gear meshing with the said second ring gear whereby said spool will be driven at a greater rate than the first ring gear when the latter is rotated by said handle.

3. The invention set forth in claim 1 in which a bearing is provided for each ring gear, each bearing being arranged beyond the outer diameter of the related gear and contacting the reel housing to thereby support the gear, and means for locking said ring gears and gear structure in driving relationship.

4. The invention set forth in claim 1 in which the spool is slidably mounted for movement in the direction of the reel axis and the means for causing frictional engagement comprises means for moving the spool into engagement with the said second ring gear.

5. In a fishing reel, a reel housing having a circular opening in one end, a bearing race fitted and secured within said open end, a pair of companion races, one at each side of said fixed race and arranged to rotate upon said fixed race, a pair of discs, one for each of said companion races and integral therewith, means for tying said discs together along their common axis while permitting each disc to rotate with its related race, a ring gear carried by each disc, said ring gears facing one another, a gear structure lying between said ring gears and meshing with both, said gear structure being supported by and rotatable in said fixed race whereby rotation of one disc will cause rotation of the other disc in the opposite direction, a plurality of teeth extending from the periphery of one of said discs beyond the periphery of the related race, and a pawl carried by said housing for engagement with said teeth to prevent rotation of the disc in one direction.

6. In a fishing reel, a spool, a rod normally supporting said spool, a pair of discs one at each end of said spool, a reel housing, said discs being mounted for rotation in said housing and said rod being supported in said discs, manual means for rotating one of said discs, and means for moving the other of said discs toward the manually rotated disc to lock the spool therebetween for rotation therewith, said spool being slidable on its rod.

7. The invention set forth in claim 6 in which means is provided and operative to normally maintain said spool centrally between said discs and out of engagement therewith.

8. In a fishing reel, a housing, a pair of discs mounted for rotation in said housing, a rod passing centrally through one of the discs and secured to the second disc, said rod being rotatable in the discs, a spool mounted on said rod and positioned between the discs, means for effecting movement of the rod in the direction of its axis to move said second disc into engagement with the spool and to in turn move the spool into engagement with the first disc whereby both discs and spool are rotatable as a unit, and means for rotating one of the discs.

9. The invention set forth in claim 8 in which the means for moving the rod comprises an adjustable spring mechanism for urging said discs and spool into engagement and with a variable pressure.

10. In a fishing reel, a housing, a gear train having at least one gear mounted for rotation within one end of said housing, a disc mounted for rotation in the opposite end of the housing, a rod extending through said one gear and secured to said disc, said gear and disc serving to support the rod, a spool lying intermediate the gear train and disc, a member carried by another gear of said gear train and cooperating with said rod to draw the disc toward the gear train to clamp the spool therebetween, and further manually adjustable means carried by said other gear to control the movement of said member.

11. The invention set forth in claim 10 in which the member comprises a spring element, pivoted at one end to the said other gear of the gear train and movable at its other end toward and away from the gear train with an intermediate point thereof engaging said rod, said manually adjustable means for moving said movable end toward and away from the mechanism to adjust the tension of the spring element.

12. In a fishing reel, a housing, a spool freely mounted therein, a disc located at one side of the spool, restrained against rotation in one direction and against axial movement, a second disc located at the other side of the spool, restrained against rotation in one direction and slidable axially, means for moving said second disc toward said spool, means for maintaining said spool equidistant from both discs whereby upon continued movement of said second disc the spool will be concurrently engaged by both discs and restrained thereby against rotation.

13. In a fishing reel, a housing, a spool mounted for rotation in said housing, a braking surface on one side of said spool and a ring of indentations on the inner side of the spool adjacent to said braking surface to provide an area of reduced cross section whereby the moisture from the line will serve to cool said braking surface.

14. In a fishing reel, a housing, a gear mechanism comprising a driving gear, a driven gear and an intermediate pinion, said gears being rotatable in said housing, a spool adjacent to said driven gear, a rod extending through said gears and spool, slidable to draw the spool and driven gear together, a post extending from said driving gear for manually rotating the same, a wheel threaded on the post for movement in the direction of the axis of said rod and a connection between said wheel and rod for transmitting the movement of the wheel to the rod whereby the engagement of said spool and driven gear will be controlled by the wheel.

15. In a fishing reel, a housing, a supporting rod in said housing, a spool freely rotatable on said rod and slidable coaxially thereon, a disc adjacent to one end of the spool, a second disc adjacent to the other end of the spool, said discs being coaxial with the spool, a spring between each disc and the adjacent end of the spool to normally maintain the spool centrally between the discs, means for rotating one of the discs, and means to move the discs together, said springs serving to keep the spool centralized until engaged by both discs.

16. In a fishing reel, a housing, a pair of coaxial discs directly supported by and rotatably mounted in opposite ends of said housing, a rod extending between said discs, said rod being supported thereby and secured to one of them, a spool on said rod between the discs, a braking surface at each end of the spool, said surfaces being of like area, a related braking surface on each disc, said related pairs of braking surfaces being inclined toward the axis of the rod, in opposite directions, and means for moving the rod and connected disc toward the other disc to cause engagement of the pairs of braking surfaces, whereby the said inclined surfaces will solely sustain the spool and receive the strain on the line.

17. In a fishing reel, a housing, a pair of coaxial discs independently rotatably mounted in opposite ends of said housing, and in direct engagement therewith, a spool located intermediate said discs and coaxial therewith, a braking surface at each end of the spool, a related braking surface on each disc, said related pairs of braking surfaces being inclined toward the axis of the spool, in opposite directions, and means for moving one of the discs toward the other to cause engagement of the pairs of braking surfaces, whereby the said inclined surfaces will solely sustain the spool and receive the strain on the line.

18. In a fishing reel, a housing having a circular opening therein, a pair of gears rotatable within and bearing against the periphery of said opening, a spacer to hold the gears apart, a sleeve extending through both gears with means to lock the gears in their spaced position within the opening, an idler gear between said pair of gears to communicate movement of one to the other, a spool adjacent to one of the gears, means for rotating the other gear, and means for urging the spool against the first gear whereby rotation of the second gear will, through the idler, drive the first gear and the latter will frictionally drive the spool.

19. In a fishing reel, a housing, a gear in said housing on a bearing surface of the housing beyond the pitch circle of the gear, a disc directly supported by and rotatable in said housing, a spool mounted for rotation between said gear and said disc, friction surfaces on said spool for engagement with said gear and said disc, means for rotating the gear and variable adjustable means for effecting relative axial movement of said gear, disc and spool to bring the same into contact whereby they will be rotatable in unison with any thrust on the gear being communicated directly to the housing.

20. In a fishing reel, a housing, a pair of gears mounted beyond their pitch circles for coaxial rotation in said housing, an idler gear between said two gears, pivoted in said housing, a spool mounted in said housing adjacent to one of said pair of gears and coaxial therewith, said spool being freely rotatable in the housing, means for moving the spool into engagement with the adjacent gear, means for rotating the other gear of said pair of gears whereby the spool will be rotated, with any thrust on the gear being communicated to the housing at a point beyond the pitch circle of the gears.

21. In a fishing reel having a housing, a gear mounted for rotation in said housing, a spool coaxial with said gear, and an axially movable rod extending through the gear and spool, means carried by said rod and engaging said spool to urge the spool toward the gear upon motion of said rod in one direction, in combination with a handle-carrying post on the gear, a member axially movable on the post and a spring lever pivoted on said member at one point, bearing at another point on the gear and connected to the rod at a third point whereby axial movement of the member will move the rod through the spring lever.

JAMES H. HAYES.